United States Patent
Ikeda

(10) Patent No.: US 7,050,556 B2
(45) Date of Patent: May 23, 2006

(54) KEY TELEPHONE UNIT AND KEY TELEPHONE SYSTEM

(75) Inventor: Saburou Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 365 days.

(21) Appl. No.: 10/123,405

(22) Filed: Apr. 17, 2002

(65) Prior Publication Data

US 2002/0150224 A1 Oct. 17, 2002

(30) Foreign Application Priority Data

Apr. 17, 2001 (JP) ............................. 2001-118668

(51) Int. Cl.
*H04M 1/00* (2006.01)

(52) U.S. Cl. ..................... 379/156; 379/164; 379/165

(58) Field of Classification Search ................ 379/156, 379/164, 165, 350, 157, 93.01, 93.14
See application file for complete search history.

(56) References Cited

U.S. PATENT DOCUMENTS

| | | | | |
|---|---|---|---|---|
| 5,400,397 A | * | 3/1995 | Ryu ........................... | 379/157 |
| 5,513,256 A | * | 4/1996 | Komuro ..................... | 379/156 |
| 5,652,788 A | * | 7/1997 | Hara .......................... | 379/156 |
| 5,832,071 A | * | 11/1998 | Voelker ...................... | 379/165 |
| 6,044,136 A | * | 3/2000 | Takahashi et al. ....... | 379/93.23 |
| 6,167,262 A | * | 12/2000 | Tanigawa ................... | 455/436 |
| 6,658,096 B1 | * | 12/2003 | Bremer et al. ........... | 379/93.05 |

FOREIGN PATENT DOCUMENTS

| | | |
|---|---|---|
| JP | 58-137389 | 8/1983 |
| JP | 60-64561 | 4/1985 |
| JP | 61-269492 | 11/1986 |
| JP | 62-143379 | 9/1987 |
| JP | 62-234454 | 10/1987 |
| JP | 1-208065 | 8/1989 |
| JP | 7-59134 | 3/1995 |
| JP | 2000-151808 | 5/2000 |
| JP | 2000-244955 | 9/2000 |

* cited by examiner

*Primary Examiner*—Barry W Taylor
(74) *Attorney, Agent, or Firm*—Young & Thompson

(57) ABSTRACT

A key telephone system including (a) at least three telephones, and (b) a key telephone unit connected to the three telephones through at least three communication lines including at least one public switched line, the key telephone unit including (b1) at least three connection ports to each of which each of the telephones is connected through the communication lines, each of the connection ports having a predetermined number, (b2) a first unit which informs a first telephone of numbers of vacant connection ports and a number of the connection port to which a second telephone making a call to the first telephone is connected, when the first telephone makes a call, and (b3) a controller which connects the first telephone to one of the second telephone and a third telephone, based on the numbers of vacant connection ports and the number of the connection port to which the second telephone is connected.

16 Claims, 5 Drawing Sheets

KEY TELEPHONE UNIT AND KEY TELEPHONE SYSTEM

BACKGROUND OF THE INVENTION

1. Field of the Invention

The invention relates to a key telephone unit and a key telephone system, and more particularly to a key telephone unit and a key telephone system both including a telephone.

2. Description of the Related Art

A conventional key telephone system is comprised generally of a telephone including selection buttons which emit a light to thereby inform a user of a public switched line through which a call is made, a key telephone unit which controls a telephone in transmitting a call and receiving a call, and a public switched line connected between the key telephone unit and a central telephone exchange.

In such a conventional key telephone system as mentioned above, a selection button associated to a busy public switched line is controlled to emit a light for a user to recognize that the line is now busy, and facilitate a user to push a selection button associated to a non-busy public communication line. Thus, a user can select a particular public communication line among a plurality of public communication lines, and establish connection line between his/her telephone and a public communication line.

When a call is made to the key telephone system through a public switched line, a user can connect his/her telephone to the public switched line by pushing a selection button associated with the public switched line through which the call is made.

A telephone line connecting a telephone and a key telephone unit to each other in a key telephone system causes noises, if a signal to be transmitted to a telephone from a key telephone unit for turning a selection button on is combined into a communication signal. Hence, a key telephone system is generally designed to include further two lines through which the above-mentioned signal for turning a selection button on is transmitted or received, as well as two telephone lines necessary for making communication therethrough. That is, a key telephone system is usually designed to include four telephone lines.

Hereinbelow is explained a conventional key telephone system having four telephone lines, with reference to FIG. 1.

A conventional key telephone system illustrated in FIG. 1 is comprised of telephones E1 to En, a key telephone unit 2, telephone lines F1 to Fn connecting the telephones E1 to En and the key telephone unit 2 to each other, and public switched lines B1 to Bn connected to the key telephone unit 2.

Each of the telephones E1 to En is designed to have selection buttons (not illustrated), a communication interface 8 and a communication controller 7. Herein, the selection buttons correspond to the public switched lines B1 to Bn. A particular public switched line is selected by pushing a selection button associated with the particular public switched line.

Each of the telephone lines F1 to Fn is comprised of four lines including two lines necessary for making communication therethrough and two lines necessary for transmitting and receiving signals therethrough such a signal for turning a selection button on.

The communication interface 8 in the telephone E1, for instance, allows a user to make communication with the other telephones E2 to En, and allows the telephone E1 to connect to the public switched lines B1 to Bn.

The communication controller 7 transmits a loop signal and a light-on signal to the key telephone unit 2, and receives a button-on signal from the key telephone signal 2. The loop signal indicates that a telephone associated with the communication controller 7 is hooked off, and the light-on signal indicated that a particular selection button among the selection buttons was pushed. The button-on signal indicates a particular selection button to be turned on.

The key telephone unit 2 is comprised of first ports C1 to Cn, second ports D1 to Dn, a switch 3, and a controller 4.

Each of the first ports C1 to Cn connects the associated telephone E1 to En to the switch 3. On receipt of a loop signal, each of the first ports C1 to Cn transfers the received loop signal to the controller 4 for informing the controller 4 of which telephone among the telephones E1 to En is hooked off.

Each of the second ports D1 to Dn connects the associated public switched line B1 to Bn to the switch 3. On detecting a call transmitted through the public switched lines B1 to Bn, each of the public switched lines B1 to Bn informs the controller 4 of the detection.

The switch 3 connects the public switched lines B1 to Bn to telephones E1 to En to each other, or connects the telephones E1 to En to each other.

When a call is made through any one of the public switched lines B1 to Bn, the controller 4 identifies one of the public switched lines B1 to Bn through which a call is made, based on signals transmitted from the second ports D1 to Dn, and produces a light-on signal in association with the public switched line B1 to Bn through which a call was made. The thus produced light-on signal is transmitted to the associated telephone E1 to En for turning a selection button thereof on.

When a call is made from the telephone E1, for instance, through the public switched line B1, the controller 4 identifies the telephone E1, based on both a button-on signal indicating that the selection button associated with the public switched line B1 is pushed and emits a light, and a loop signal received from the first port C1, and transmits a light-on signal associated with the public switched line B1 selected by the telephone E1, to the telephones E1 to En.

The controller 4 further transmits a command signal to the switch 3. In accordance with the command signal, the switch 3 connects any one of the public switched lines B1 to Bn to any one of the telephones E1 to En, or connects any two of the telephones E1 to En to each other.

Hereinbelow is explained an operation of the conventional key telephone system illustrated in FIG. 1.

It is now assumed that the telephone E1 transmits a call. If the telephone E1 is hooked off, the communication controller 7 associated with the telephone E1 transmits a loop signal to the first port C1. If a user of the telephone E1 does not select a particular public switched line among the public switched lines B1 to Bn by pushing a selection button associated with a particular public switched line, but wants to use any one of the public switched lines B1 to Bn, the controller 4 in the key telephone unit 2 detects non-used or available public switched lines B1 to Bn, and transmits a command to the switch 3 for causing the switch 3 to connect the public switched line B1 to the hooked-off telephone E1.

Then, the controller 4 transmits an instruction to the switch 3 to transmit the loop signal having been received from the telephone E1 to the public switched line B1 through the second port D1.

Then, the switch 3 connects the first port C1 having been connected to the telephone E1, to the second port D1 having been connected to the public switched line B1, to thereby connect the telephone E1 and the public switched line B1 to each other.

Herein, it is assumed that a call is made to the key telephone unit 2 through the public switched line B1.

A call signal transmitted from an exchange (not illustrated) is introduced into the key telephone unit 2 through the public switched line B1 to which the exchange is connected.

Then, the second port D1 in the key telephone unit 2 detects the call signal transmitted through the public switched line B1, and informs the controller 4 of the detection of the call signal.

The controller 4 informed of the detection of the call signal identifies the public switched line B1 through which the call signal was transmitted, and produces a light-on signal associated with the public switched line B1. The thus produces light-on signal is transmitted to the telephones E1 to En.

On receipt of the light-on signal through the communication controller 7, each of the telephones E1 to En turns on a selection button indicated by the received light-on signal for annunciating a user that a call has been received.

Then, a user selects and pushes a particular selection button of the telephone E1 and hook the telephone E1 off. As a result, the communication controller 7 of the telephone E1 transmits a loop signal and a button-on signal to the first port C1. As mentioned earlier, a loop signal is produced when a telephone is hooked off, and a button-on signal is produced when any one of the selection buttons is pushed.

Then, when the first port C1 receives both the loop signal and the button-on signal, the first port C1 informs the controller 4 that a particular telephone is hooked off, and a particular selection button is pushed.

Then, the controller 4 operates the switch 3 such that the telephone E1 having received the light-on signal and the loop signal and the public switched line B1 are connected to each other. Thus, a communication line is established between the telephone E1 and the public switched line B1.

The above-mentioned conventional key telephone unit and key telephone system did not have uniformity in specification. That is, there were various key telephone units and key telephone systems having different specification. Hence, it was necessary to purchase telephones inherent to specific key telephone unit and key telephone system. Such telephones are more expensive than generally available telephones.

In addition, such telephones are necessary to include an additional unit for conducting modular jack junction through a modem to be used for carrying out dial-up Internet connection.

Japanese Unexamined Patent Publication No. 58-137389 (A) has suggested an electronic key telephone unit including a plurality of button-type telephones, and a main unit having a switch network connecting a plurality of extension telephone circuits to the button-type telephones, and a central processing unit which controls the switch network. The electronic key telephone unit further includes a memory circuit electrically connected to the central processing unit, and storing extension numbers of first and second button-type telephones when the first button-type telephone makes a call to the second button-type telephone to thereby connect the first and second button-type telephones to each other, and a display unit equipped in each of the button-type telephones. When the first button-type telephone makes a call to the second button-type telephone, if the second button-type telephone is busy or does not make a response, extension numbers of the first and second button-type telephones are stored in the memory circuit by operating buttons in the first button-type telephone, and the extension number of the first button-type telephone is displayed in the display unit of the second button-type telephone.

Japanese Unexamined Patent Publication No. 61-269492 (A) has suggested a key telephone system including a key telephone having a selector which selects a pair among a plurality of pairs of subscriber lines, a parent station, and a child station. The parent station includes first unit for detecting and analyzing a code for calling a person, input by a caller of the subscriber line at touch tone, and a first radio unit which selects a child station associated with the code, and transmits a selection number associated with the subscriber line. The child station includes a second radio unit which receives a radio signal transmitted from the first radio unit, and a display unit which reproduces voices in accordance with signals output from the second radio unit, and displays the selection number.

Japanese Unexamined Patent Publication No. 62-234454 (A) has suggested a line interface unit including a plurality of connection terminals for connecting a plurality of telephone type terminals including a telephone which automatically or manually transmits or receives a call, to at least one non-telephone type terminal, a terminal interface which controls interfaces between the telephone type terminals and the non-telephone type terminal, a connection terminal connected to a telephone line network, a second interface which controls an interface between the connection terminal and the telephone line network, a modem which modulates and demodulates data transmitted between non-telephone type terminals, a controller which controls operation of the above-mentioned parts. The controller cooperates with the parts to preferentially allow communication to be made, regardless that a call is transmitted or received.

Japanese Unexamined Patent Publication No. 1-208065 (A) has suggested a key telephone connected to an exchange system in which a number of a caller is annunciated to a receiver when the receiver receives a call made from the caller. The key telephone includes a subscriber interface connected to a digital subscriber line, a digital switch, a controller which controls operation of the subscriber interface and the digital switch, and a memory electrically connected to the controller. Data indicative of relation between an extension number and a caller's number, and data indicative of relation between an extension number and a station number included in a caller's number are stored in advance in the memory. The subscriber interface receives a caller's number, and the controller analyzes the received caller's number and makes comparison of the caller's number with data stored in the memory. The controller calls a telephone associated with the extension number in accordance with the stored data.

Japanese Unexamined Patent Publication No. 2000-151808 (A) has suggested an apparatus which receives a request from a subscriber, and connects the subscriber to Internet through a provider. The apparatus includes a subscriber line interface which receives a request to connect to Internet, from a subscriber, a first detector which detects the request, a second detector which detects a telephone number of the subscriber, based on the request, a time administrator which judges whether a time period during which the request has been received is within a time period allowable for providing Internet connection service, a first controller which makes inspection as to whether the telephone number of the subscriber is allowed to receive Internet connection service, a second controller which judges whether a response is made to the request, based on the inspection result, and an interface connected to the provider. The apparatus is accommodated in an exchange as an extension terminal.

However, the above-mentioned problems remain unsolved even in the above-mentioned Publications.

SUMMARY OF THE INVENTION

In view of the above-mentioned problems in the conventional key telephone unit and key telephone system, it is an object of the present invention to provide a key telephone unit and a key telephone system both eliminating necessity of using a telephone inherent to particular key telephone unit and key telephone system, and allowing a user to use a generally available cheap telephone.

In one aspect of the present invention, there is provided a key telephone unit including (a) at least three connection ports to each of which a telephone is connected through communication lines including at least one public switched line, each of the connection ports having a predetermined number, (b) a first unit which informs a first telephone of numbers of vacant connection ports and a number of the connection port to which a second telephone making a call to the first telephone is connected, when the first telephone makes a call, and (c) a controller which connects the first telephone to one of the second telephone and a third telephone, based on the numbers of vacant connection ports and the number of the connection port to which the second telephone is connected.

The key telephone unit in accordance with the present invention makes it possible to construct a key telephone system including generally available peripheral devices one of which is a telephone, ensuring remarkable reduction in cost for introducing a key telephone system and enhancement in general availability.

In addition, since the key telephone unit may include a home-use telephone, it would be possible to readily accomplish dial-up Internet connection at low costs by means of modular jack junction through the use of a generally available modem.

Thus, a user can use a peripheral device fabricated in mass-production at low costs, ensuring reduction in costs for fabricating a key telephone unit, and further ensuring enhancement in availability.

It is preferable that at least one of the communication lines is comprised of a pair of lines including a signal-transmission line and a signal-receipt line.

By comprising a communication line of a pair of lines including a signal-transmission line and a signal-receipt line, it would be possible to construct a key telephone system through the use of a communication line generally used for making communication in homes.

Thus, a user can use a peripheral device fabricated in mass-production at low costs, ensuring reduction in costs for fabricating a key telephone unit, and further ensuring enhancement in availability.

There is further provided a key telephone system including (a) at least three telephones, and (b) a key telephone unit connected to the three telephones through at least three communication lines including at least one public switched line, the key telephone unit including (b1) at least three connection ports to each of which each of the telephones is connected through the communication lines, each of the connection ports having a predetermined number, (b2) a first unit which informs a first telephone of numbers of vacant connection ports and a number of the connection port to which a second telephone making a call to the first telephone is connected, when the first telephone makes a call, and (b3) a controller which connects the first telephone to one of the second telephone and a third telephone, based on the numbers of vacant connection ports and the number of the connection port to which the second telephone is connected.

It is preferable that each of the telephones is equipped with a display unit in which the numbers of vacant connection ports and the number of the connection port to which the second telephone is connected are displayed in accordance with commands transmitted from the controller.

As a telephone equipped with a display unit, a telephone having a function of displaying a telephone number of a caller may be used, for instance.

The display unit may be comprised of a display unit of a personal computer terminal to which the telephone is electrically connected. For instance, a cathode ray tube (CRT) or a liquid crystal display (LCD) device including a thin film transistor (TFT) may be used as the display unit.

The key telephone system may further include a splitter and a modem arranged between each of the telephones and the key telephone unit.

The key telephone system may further include a splitter arranged between each of the communication lines and the key telephone unit.

There is further provided a key telephone system including (a) at least three telephones, (b) personal computers associated with the telephones and connected to one another through local area network (LAN), and (c) a key telephone unit connected to the telephones through at least three communication lines including at least one public switched line, the key telephone unit including (c1) at least three connection ports to each of which each of the telephones is connected through the communication lines, each of the connection ports having a predetermined number, (c2) a first unit which informs a first telephone of numbers of vacant connection ports and a number of the connection port to which a second telephone making a call to the first telephone is connected, when the first telephone makes a call, and (c3) a controller which connects the first telephone to one of the second telephone and a third telephone, based on the numbers of vacant connection ports and the number of the connection port to which the second telephone is connected.

For instance, each of the telephones may be equipped in the associated personal computer.

In another aspect of the present invention, there is provided a method of controlling a key telephone unit including at least three connection ports to each of which a telephone is connected through communication lines including at least one public switched line, each of the connection ports having a predetermined number, the method including the steps of (a) informing a first telephone of numbers of vacant connection ports and a number of the connection port to which a second telephone making a call to the first telephone is connected, when the first telephone makes a call, and (b) connecting the first telephone to one of the second telephone and a third telephone, based on the numbers of vacant connection ports and the number of the connection port to which the second telephone is connected.

The method may further include the step of displaying the numbers of vacant connection ports and the number of the connection port to which the second telephone is connected.

The advantages obtained by the aforementioned present invention will be described hereinbelow.

The present invention makes it possible to use generally available peripheral devices one of which is a telephone for home-use, ensuring remarkable reduction in cost for introducing a key telephone system and enhancement in general availability.

In addition, since a home-use telephone may be used, it would be possible to readily accomplish dial-up Internet connection at low costs by means of modular jack junction through the use of a generally available modem.

Thus, a user can use a peripheral device fabricated in mass-production at low costs, ensuring reduction in costs for fabricating a key telephone unit, and further ensuring enhancement in availability.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

FIRST EMBODIMENT

Figure 1:
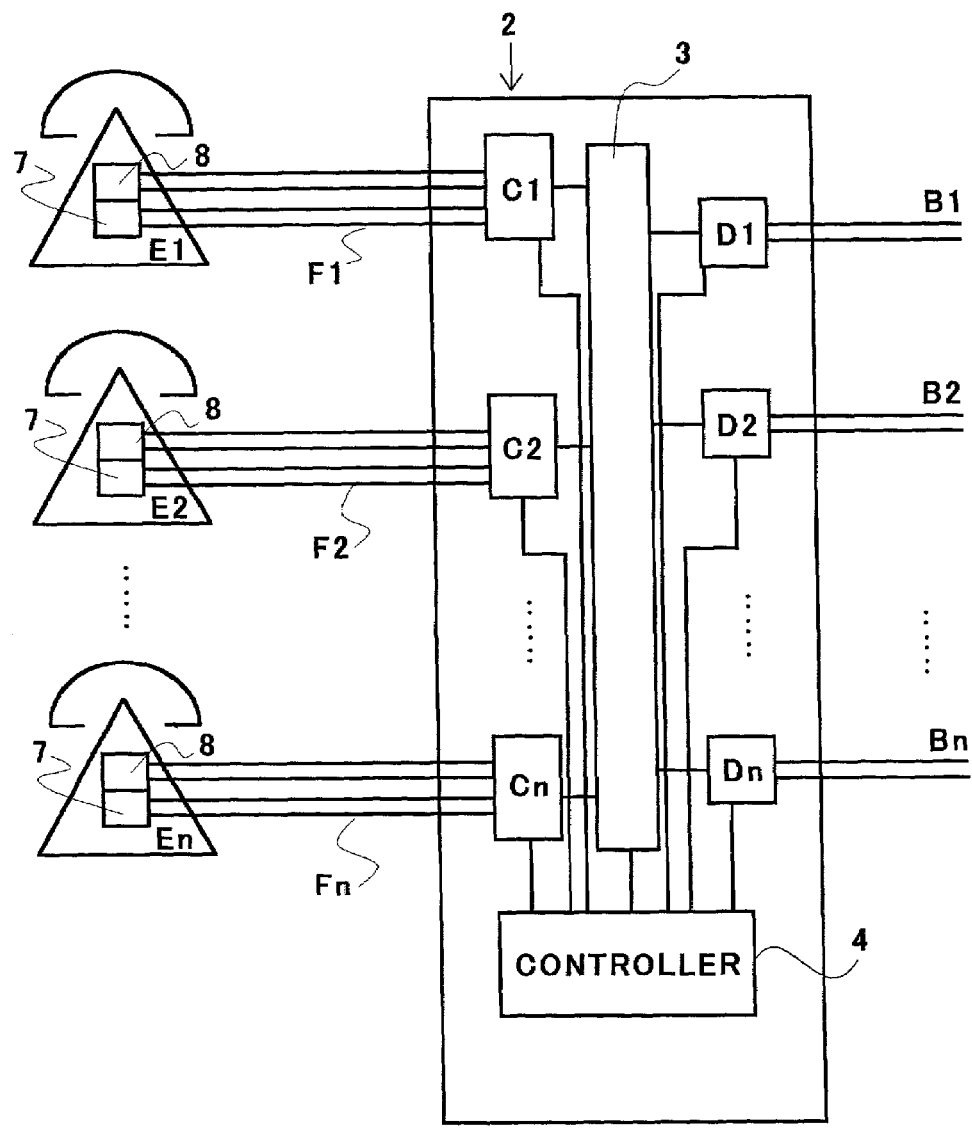
FIG. 1 is a block diagram of a conventional key telephone system including a conventional key telephone unit.
Figure 2:
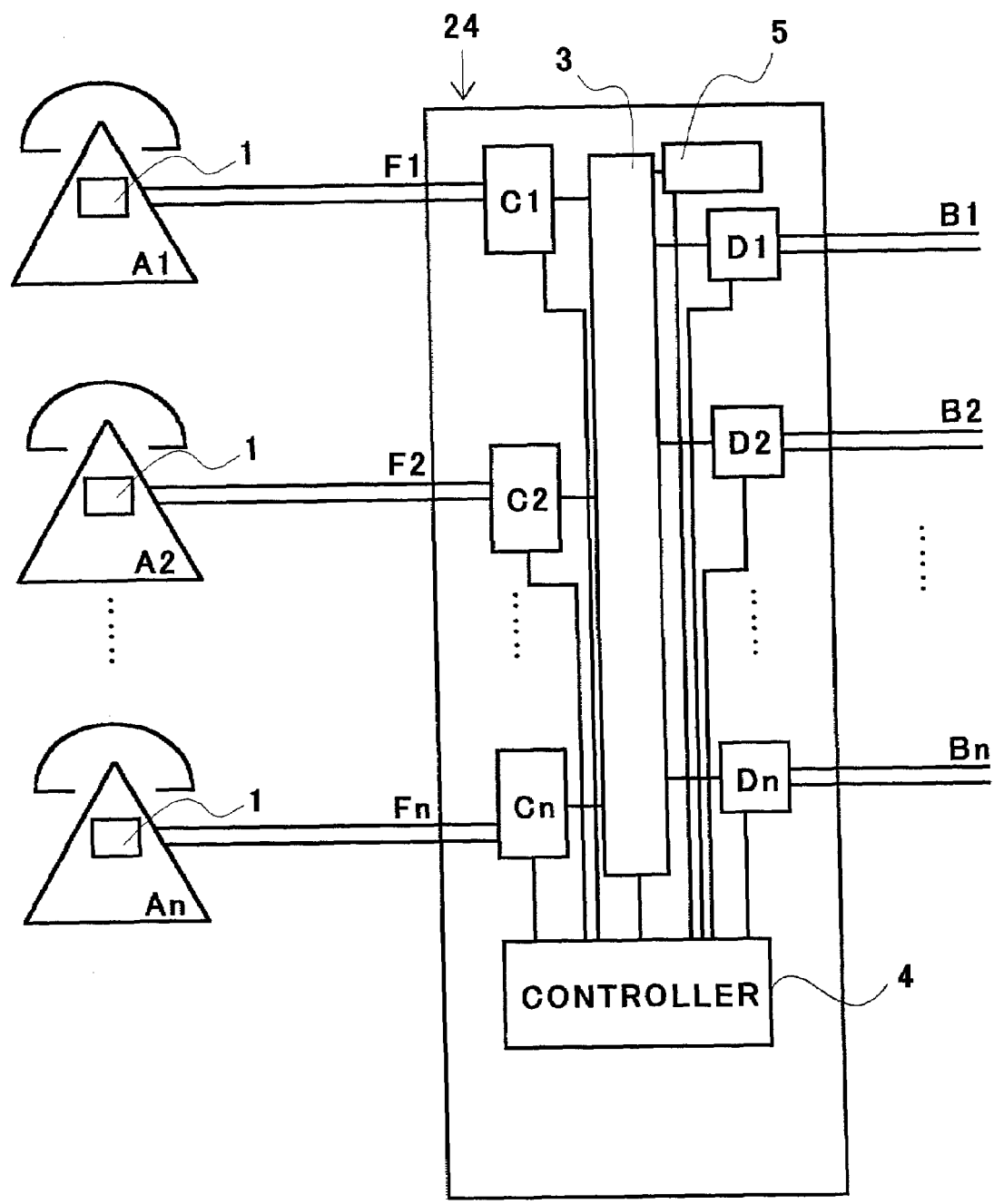
FIG. 2 is a block diagram of a key telephone system in accordance with the first embodiment of the present invention.

FIG. 2 is a block diagram of a key telephone system in accordance with the first embodiment of the present invention.

With reference to FIG. 2, the key telephone system in accordance with the first embodiment is comprised of a key telephone unit 24, a plurality of internal telephones A1 to An each of which is comprised of two lines and is equipped with a display unit 1 such as a liquid crystal display device, a plurality of telephone lines F1 to Fn connecting the internal telephones A1 to An and the key telephone unit 24 to each other, and a plurality of public switched lines B1 to Bn which connects external telephones (not illustrated) and the key telephone unit 24 through an exchange (not illustrated).

Call signals and receipt signals are transmitted between the internal telephones A1 to An and the public switched lines B1 to Bn or among the internal telephones A1 to An through the key telephone unit 24. The key telephone unit 24 control these signals.

Herein, an external telephone indicates telephones connected to the key telephone unit 24 through any one of the public switched lines B1 to Bn, and an internal telephone indicates telephones except the thus defined external telephones.

Each of the internal telephones A1 to An having the display unit 1 may be comprised of a telephone receiving analog or digital signals and having function of displaying a caller's number, for instance. The internal telephones A1 to An are not an internal telephone inherently used for a particular key telephone system or a particular key telephone unit such as the key telephone unit 24, but a generally available telephone for home-use.

Each of the internal telephones A1 to An transmits a loop signal when each of the internal telephones A1 to An is hooked off, and does not transmit a loop signal when each of the internal telephones A1 to An is hooked on. In other words, each of the internal telephones A1 to An informs the key telephone unit 24 that the telephone lines F1 to Fn connected to the internal telephones A1 to An are able to be connected thereto, that is, the telephone lines F1 to Fn are vacant, by not transmitting a loop signal to the key telephone unit 24.

The telephone lines F1 to Fn are mediums through which data or signals are transmitted or received between the internal telephones A1 to An and the key telephone unit 24. It is preferable that the telephone lines F1 to Fn are comprised of a pair of lines, that is, totally two lines necessary for making communication therethrough. Specifically, each of the telephone lines F1 to Fn is comprised of a signal-transmission line and a signal-receipt line.

The internal telephones A1 to An are connected to the public switched lines B1 to Bn by connecting the telephone lines F1 to Fn to the public switched lines B1 to Bn.

The key telephone unit 24 is comprised of internal telephone connection ports C1 to Cn connected to the internal telephones A1 to An through the telephone lines F1 to Fn, public switched line connection ports D1 to Dn connected to the public switched lines B1 to Bn, a switch 3 connecting the internal telephones A1 to An to one another or connecting the internal telephones A1 to An to the public switched lines B1 to Bn, a controller 4 controlling operation of the key telephone unit 24, and a guidance transmitter 5.

The guidance transmitter 5 transmits predetermined numbers assigned to the internal telephone connection ports C1 to Cn and the public switched line connection ports D1 to Dn, to the display units 1 equipped in the internal telephones A1 to An such that the display units 1 can display the numbers. The guidance transmitter 5 further receives a dialed number from the internal telephones A1 to An, judges whether the internal telephones A1 to An can be connected to external telephones through the public switched lines B1 to Bn, and transmits judgment results to the controller 4.

The controller 4 controls the key telephone unit 24 with respect to connection among the internal telephones A1 to An through the telephone lines F1 to Fn, connection between the internal telephones A1 to An and the external telephones through both the telephone lines F1 to Fn and the public switched lines B1 to Bn, transmission of an instruction to the guidance transmitter 5 to transmit predetermined numbers to the controller 4, making decision about arrangement of predetermined numbers having been transmitted to the guidance transmitter 5 and to be displayed in the display units 1, and so on.

Herein, predetermined numbers include identifiers assigned to each of the internal telephone connection ports C1 to Cn and the public switched line connection ports D1 to Dn, an identifier in accordance with which the internal telephones A1 to An is connected to a selected external telephone, and an identifier in accordance with which the internal telephones A1 to An are connected to each other through the telephone lines F1 to Fn, and so on. These identifiers are defined by figures and symbols which can be displayed through dials or buttons of the internal telephones A1 to An. For instance, a predetermined number may be defined by any one of FIGS. 0 to 9 or symbols such as "*" and "#". The thus defined predetermined number may be stored in the controller 4.

Hereinbelow is explained an operation for connecting the internal telephones A1 and A2 to each other.

When the internal telephone A1 is hooked off, the internal telephone A1 produces and transmits a loop signal to the internal telephone connection port C1 through the telephone line F1. The internal telephone connection port C1 transfers the received loop signal to the controller 4.

The controller 4 detects that the internal telephone A1 is hooked off, based on the fact that the loop signal is received from the internal telephone connection port C1.

Then, the controller 4 transmits an instruction to the guidance transmitter 5 to transmit a selection signal to the internal telephone A1 for selecting any one of the internal telephones A2 to An to which the internal telephone A1 is to be connected, and further, connects the internal telephone connection port C1 and the guidance transmitter 5 to each other through the switch 3.

Then, the guidance transmitter 5 transmits predetermined numbers assigned to the internal telephone connection ports C2 to Cn to which the internal telephones A2 to An all not busy now are connected, to the internal telephone A1.

Then, after confirming the predetermined number displayed on the display unit 1 equipped in the internal telephone A1, a user dials a predetermined number assigned to the internal telephone A2 with which a user wants to make communication through the internal telephone A1.

On receipt of the predetermined number assigned to the internal telephone A2, the guidance transmitter 5 transmits the predetermined number and an extension number both assigned to the internal telephone connection port C1, to the internal telephone A2.

On receipt of the predetermined number and an extension number both assigned to the internal telephone connection port C1 to which the internal telephone A1 is connected through the telephone line F1, the internal telephone A2 displays the received predetermined number on the display unit 1, and rings a bell.

After confirming the predetermined number displayed on the display unit 1 of the internal telephone A2, a user hooks the internal telephone A2 off. Then, the internal telephone A2 transmits a loop signal to the internal telephone connection port C2.

Then, the internal telephone connection port C2 detects the loop signal received from the internal telephone A2, and transfer the received loop signal to the controller 4.

The controller 4 identifies the internal telephone A2 by virtue of the received loop signal, and transmit an instruction to the switch 3 to establish connection between the internal telephones A1 and A2.

Then, the switch 3 connects the internal telephone connection port C1 to which the internal telephone A1 is connected and the internal telephone connection port C2 to which the internal telephone A2 is connected, to each other to thereby connect the internal telephones A1 and A2 to each other.

Hereinbelow is explained a case where the internal telephone A1 and an external telephone are connected to each other through the public switched line B1.

First, the controller 4 detects a loop signal transmitted from the internal telephone A1 when the internal telephone A1 is hooked off, in the same manner as mentioned above in the operation for connecting the internal telephones A1 and A2 to each other.

Then, the controller 4 transmits an instruction to the guidance transmitter 5 to transmit an instruction to the internal telephone A1 for selecting any one of the public switched lines B1 to Bn to which the internal telephone A1 is to be connected. The controller 4 further connects the internal telephone connection port C1 and the guidance transmitter 5 to each other through the switch 3.

Then, the guidance transmitter 5 transmits predetermined numbers assigned to the public switched line connection ports D1 to Dn to which the public switched lines B1 to Bn all not busy now are connected, to the internal telephone A1.

On receipt of the predetermined numbers, the internal telephone A1 displays the received predetermined numbers in the display unit 1.

Then, a user dials a predetermined number assigned to the public switched line connection port D1 with which a user wants to make communication through the internal telephone A1. As a result, the internal telephone A1 transmits the predetermined number to the guidance transmitter 5.

On receipt of the predetermined number, the guidance transmitter 5 identifies the public switched line connection port D1 to which the predetermined number is assigned, and informs the controller 4 of the identification of the public switched line connection port D1.

Then, the controller 4 transmits an instruction to the switch 3 to cause the switch 3 to connect the internal telephone A1 having transmitted the predetermined number and the public switched line connection port D1 to which the predetermined number received from the internal telephone A1 is assigned, to each other.

Hereinbelow is explained an operation for connecting the internal telephone A1 to An to external telephones, and an operation for connecting the internal telephones A1 to An to one another, when the internal telephone A1 to An makes a call.

First, predetermined numbers are stored in the key telephone unit 24. The predetermined numbers are used for the internal telephones A1 to An to select an external telephone to which the internal telephone A1 to An is to be connected, when the internal telephone A1 to An makes a call.

The predetermined numbers are transmitted from the guidance transmitter 5 to the internal telephones A1 to An all now hooked on. On receipt of the predetermined numbers, the internal telephones A1 to An select one of the predetermined numbers, that is, select one of external telephones.

An extension telephone and an external telephone are switched in the above-mentioned manner.

It is now assumed that a predetermined number "0" is determined in advance as a number by which an external telephone line is selected.

If the guidance transmitter 5 transmits an instruction indicative of "external telephone line 0" to one of the internal telephones A1 to An, a user dials "0" in one of the internal telephones A1 to An. As a result, the predetermined number "0" is transmitted to the guidance transmitter 5 from one of the internal telephones A1 to An. On receipt of the predetermined number "0", the guidance transmitter 5 recognizes that a user wants to make communication with an external telephone.

Thereafter, the guidance transmitter 5 transmits predetermined numbers assigned to the public switched line connection ports D1 to Dn all not busy now, to the internal telephones A1 to An. A user selects one of the public switched line connection ports D1 to Dn by dialing a predetermined number through the internal telephones A1 to An.

An operation for connecting the internal telephones A1 to An and an external telephone to each other and an operation for connecting the internal telephones A1 to An to each other are carried out in the same way as the above-mentioned operation.

Hereinbelow is explained a case where when an external telephone makes a call to the key telephone unit 24 through the public switched line B1, the public switched line B1 is connected to the internal telephone A1.

When a calling signal is transmitted to the public switched line B1 from an external telephone through an exchange (not illustrated), the public switched line connection port D1 to which the public switched line B1 is connected detects that a call has been made, and then, the public switched line connection port D1 transfers the received calling signal to the controller 4.

On receipt of the calling signal from the public switched line connection port D1, the controller 4 identifies the public switched line B1 to which a call has been made.

Then, the controller 4 transmits both the predetermined number assigned to the public switched line connection port D1 to which a call was made and the calling signal, to the internal telephone connection ports C1 to Cn to which the internal telephones A1 to An which are hooked on, and hence, do not transmit a loop signal, are connected.

On receipt of the predetermined number assigned to the public switched line connection port D1 and the calling signal, the internal telephone A1 to An rings a bell, and displays the received predetermined number on the display unit 1 to thereby let a user know that a call has been made to the public switched line connection port D1 through the public switched line B1.

Then, after the internal telephone A1 has been hooked off, the controller 4 transmits an instruction to the switch 3 to connect the internal telephone A1 in which the predetermined number assigned to the public switched line connection port D1 was dialed, and an external telephone to each other. On receipt of the instruction, the switch 3 connects the internal telephone A1 and the external telephone to each other.

When the connection between the internal telephone A1 in which the predetermined number has been dialed and the public switched line B1 has been established, the controller 4 stops transmitting calling signals to the internal telephones A2 to An.

When two or more calls are simultaneously made from external telephones through two or more public switched lines among the public switched lines B1 to Bn, all of the predetermined numbers assigned to the public switched line connection ports to which the calls has been made, and the calling signals are transmitted to the internal telephones A1 to An all now being hooked on.

The internal telephones A1 to An, which will receive the predetermined numbers assigned to the public switched line connection ports D1 to Dn to which calls has been made, and calling signals when calls are made to the public switched line connection ports D1 to Dn, may be designed to receive those numbers and signals through the internal telephone connection ports C1 to Cn which are set in advance to receive or refuse receiving those numbers and signals. The controller 4 may set the internal telephone connection ports C1 to Cn to do so by transmitting a predetermined number to each of the internal telephone connection ports C1 to Cn.

For instance, assuming that the internal telephone A2 is connected to the internal telephone connection port Cm (m=1, 2, - - -, n) which is set not to receive a calling signal, the internal telephone A2 may be set not to receive a calling signal even if the internal telephone A2 is in a condition of being hooked on.

SECOND EMBODIMENT

Figure 3:
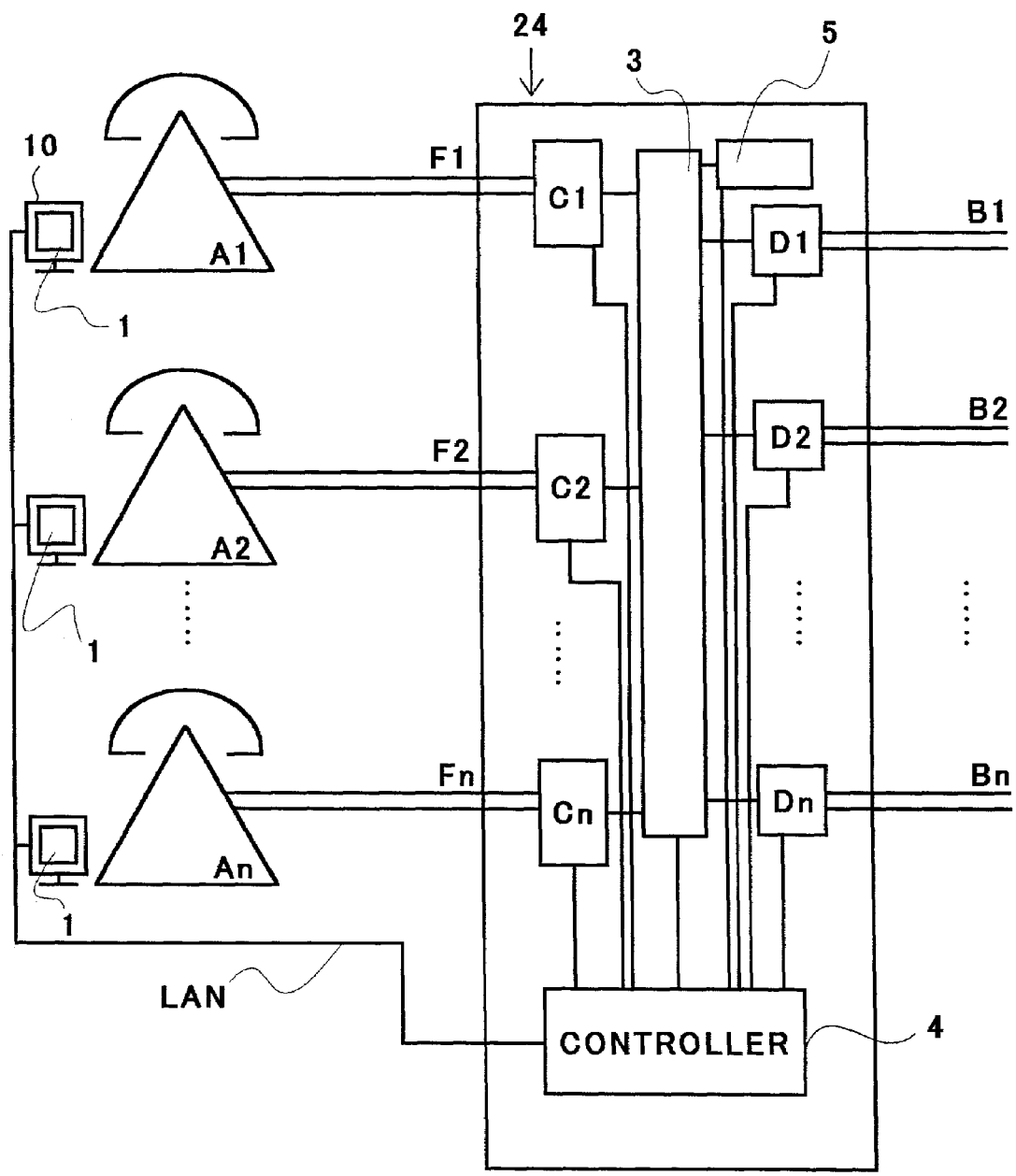
FIG. 3 is a block diagram of a key telephone system in accordance with the second embodiment of the present invention.

FIG. 3 is a block diagram of a key telephone system in accordance with the second embodiment of the present invention.

The key telephone system in accordance with the second embodiment is structurally different from the key telephone system in accordance with the first embodiment in further including personal computers 10 associated with the internal telephones A1 to An.

The personal computers 10 are operatively connected to the internal telephones A1 to An, and are connected to one another through local area network (LAN). In addition, a display screen of each of the personal computers 10 acts as the display unit 1.

The key telephone system in accordance with the second embodiment provides the same advantages as those obtained by the key telephone system in accordance with the first embodiment.

Though the internal telephones A1 to An are separately arranged from the personal computers 10, the internal telephones A1 to An may be arranged to be equipped in the personal computers 10.

THIRD EMBODIMENT

Figure 4:
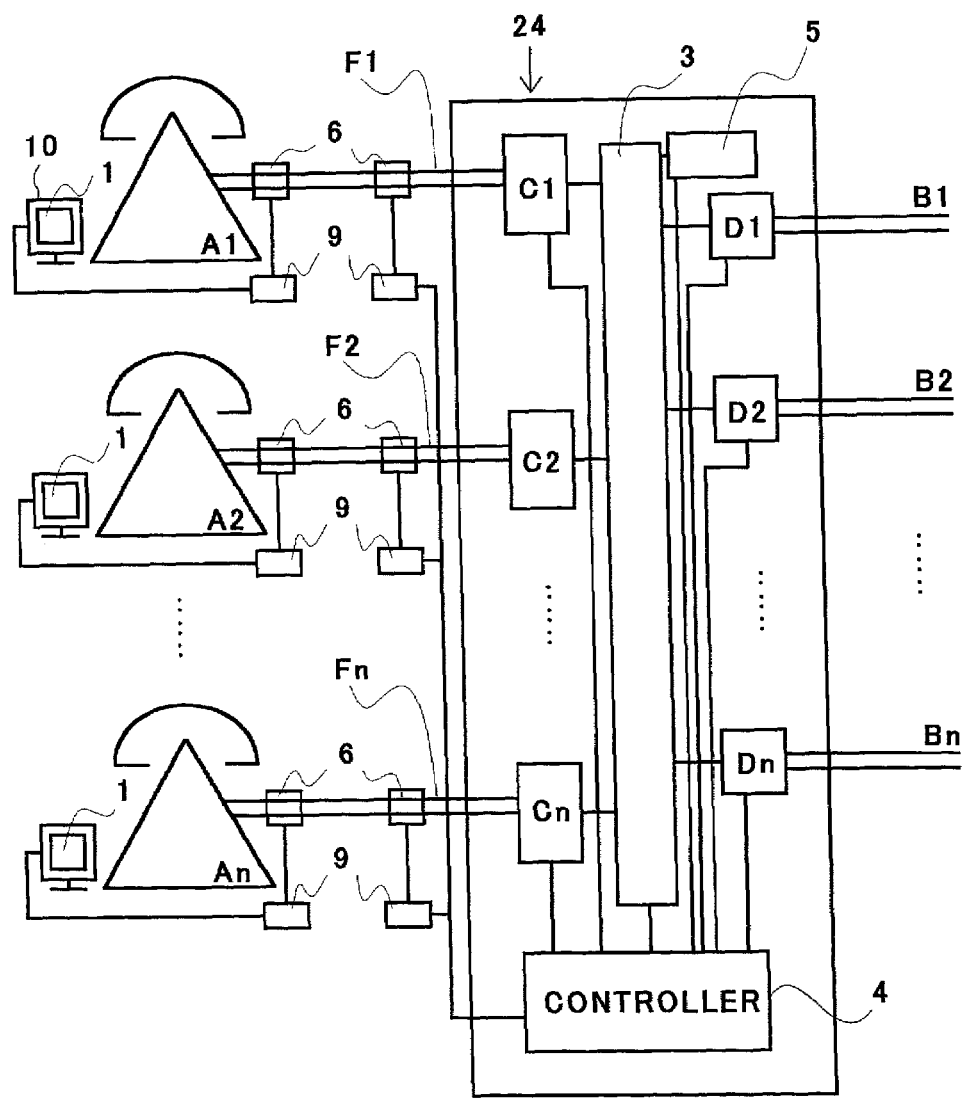
FIG. 4 is a block diagram of a key telephone system in accordance with the third embodiment of the present invention.

FIG. 4 is a block diagram of a key telephone system in accordance with the third embodiment of the present invention.

The key telephone system in accordance with the third embodiment is designed to have xDSL (x Digital Subscriber Line) as a communication line. Specifically, the key telephone system in accordance with the third embodiment is structurally different from the key telephone system in accordance with the second embodiment in further including splitters 6 and modems 9 arranged between the key telephone unit 24 and the internal telephones A1 to An, that is, on the telephone lines F1 to Fn.

In the key telephone system in accordance with the third embodiment, the splitters 6 separate an aural signal from a control signal including a calling signal, predetermined numbers and a loop signal. The thus separated control signal is received at the personal computer 10, and displayed on a display screen 1 of the personal computer 10. Hence, a user can control and monitor an operation of the key telephone unit 24 and the key telephone system.

FOURTH EMBODIMENT

Figure 5:
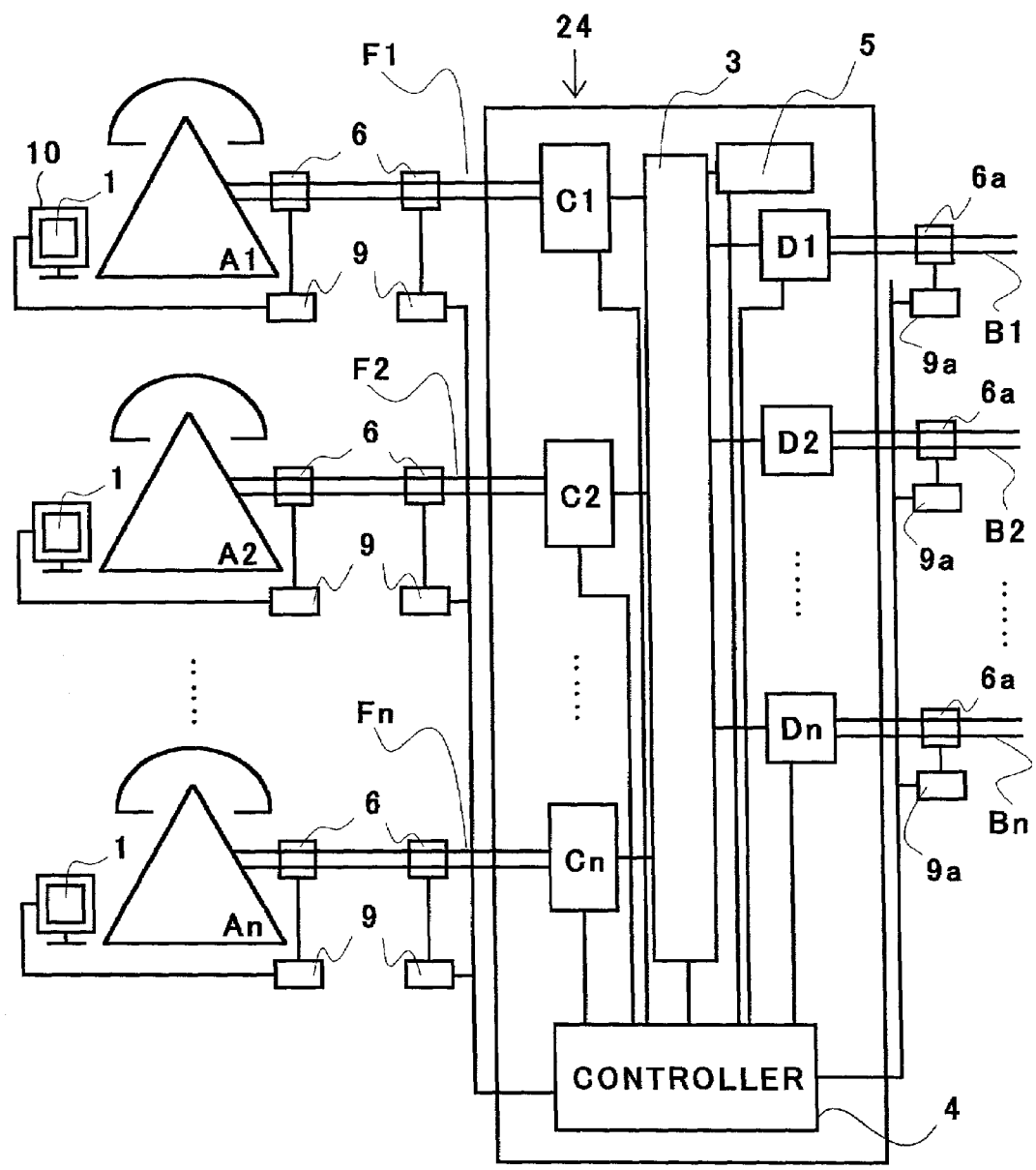
FIG. 5 is a block diagram of a key telephone system in accordance with the fourth embodiment of the present invention.

FIG. 5 is a block diagram of a key telephone system in accordance with the fourth embodiment of the present invention.

The key telephone system in accordance with the fourth embodiment is structurally different from the key telephone system in accordance with the third embodiment in further including splitters 6a and modems 9a arranged between the key telephone unit 24 and the public switched lines B1 to Bn.

The splitters 6a separate an aural signal from a control signal. The thus separated aural and control signals are transmitted through the public switched lines B1 to Bn. Hence, a central telephone exchange can monitor communication between users, and control an operation of the key telephone unit 24 and the key telephone system through which the communication is made.

Though the guidance transmitter 5 is separately formed from the controller 4 in the above-mentioned first to fourth embodiments, the guidance transmitter 5 may be formed in the controller 4.

The predetermined numbers to be displayed on the display unit 1 may be comprised of aural signals transmitted from the controller 4 or the guidance transmitter 5, in which case, it would be possible to use internal telephones including no display unit such as the display unit 1, as a part of the key telephone system.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-118668 filed on Apr. 17, 2001 including specification, claims, drawings and summary is incorporated herein by reference in its entirety.

What is claimed is:

1. A key telephone unit comprising:
(a) at least three connection ports to each of which a telephone can be connected through communication lines, at least one of the communication lines being a public switched line, each of said connection ports having a respective predetermined identification number;
(b) a voice guidance transmitter constructed and arranged to be able to inform a first telephone connected to a first of the connection ports of the predetermined identification numbers of vacant said connection ports when the first telephone makes a call, the voice guidance transmitter also being constructed and arranged to be able to inform the first telephone connected to the first connection port of a number of the connection port to which a second telephone making a call to said first telephone is connected; and
(c) a controller constructed and arranged so as to be able to connect said first telephone to said second telephone when the second telephone is making a call to the first telephone, the controller also being constructed and arranged so as to be able to connect the first telephone to a third telephone, based on said numbers of vacant connection ports;
wherein the connection ports, the voice guidance transmitter, and controller are constructed and interconnected to allow all communication between each of the connection ports that is not connected to the public switched line and the telephone connected to that port to take place using only two signal lines.

2. The key telephone unit as set forth in claim 1, wherein at least one of said communication lines consists of a signal-transmission line and a signal-receipt line.

3. The key telephone system as set forth in claim 1, further comprising a splitter arranged between each of said communication lines and said key telephone unit.

4. The key telephone unit as set forth in claim 1, wherein at least one of said communication lines consists of a signal-transmission line and a signal-receipt line.

5. A key telephone system comprising:
(a) at least three telephones; and
(b) a key telephone unit connected to said at least three telephones through at least three communication lines including at least one public switched line,
said key telephone unit including:
(b1) at least three connection ports to each of which a respective one of said telephones is connected through a respective one of said communication lines, each of said connection ports having a respective predetermined identification number;
(b2) a voice guidance transmitter constructed and arranged to be able to inform a first telephone connected to a first of the connection ports of the predetermined identification numbers of vacant said connection ports when the first telephone makes a call, the voice guidance transmitter also being constructed and arranged to be able to inform the first telephone connected to the first connection port of a number of the connection port to which a second telephone making a call to said first telephone is connected; and
(b3) a controller constructed and arranged so as to be able to connect said first telephone to said second telephone when the second telephone is making a call to the first telephone, the controller also being constructed and arranged so as to be able to connect the first telephone to a third telephone, based on said numbers of vacant connection ports;
wherein the connection ports, the voice guidance transmitter, and controller are constructed and interconnected to allow all communication between each of the connection ports that is not connected to the public switched line and the telephone connected to that port to take place using only two signal lines.

6. The key telephone system as set forth in claim 5, wherein at least one of said communication lines consists of a signal-transmission line and a signal-receipt line.

7. The key telephone system as set forth in claim 5, wherein each of said telephones is equipped with a display unit in which said numbers of vacant connection ports and said number of said connection port to which said second telephone is connected are displayed in accordance with commands transmitted from said controller.

8. The key telephone system as set forth in claim 5, further comprising a splitter and a modem arranged between each of said telephones and said key telephone unit.

9. A key telephone system comprising:
(a) at least three telephones;
(b) personal computers associated with said telephones and connected to one another through local area network (LAN); and
(c) a key telephone unit connected to said telephones through at least three communication lines including at least one public switched line,
said key telephone unit including:
(c1) at least three connection ports to each of which a respective one of said telephones is connected through a respective one of said communication lines, each of said connection ports having a respective predetermined identification number;
(c2) a voice guidance transmitter constructed and arranged to be able to inform a first telephone connected to a first of the connection ports of the predetermined identification numbers of vacant said connection ports when the first telephone makes a call, the voice guidance transmitter also being constructed and arranged to be able to inform the first telephone connected to the first connection port of a number of the connection port to which a second telephone making a call to said first telephone is connected; and (c3) a controller constructed and arranged so as to be able to connect said first telephone to said second telephone when the second telephone is making a call to the first telephone, the controller also being constructed and arranged so as to be able to connect the first telephone to a third telephone, based on said numbers of vacant connection ports;

wherein the connection ports, the voice guidance transmitter, and controller are constructed and interconnected to allow all communication between each of the connection ports that is not connected to the public switched line and the telephone connected to that port to take place using only two signal lines.

10. The key telephone system as set forth in claim 9, wherein said numbers of vacant connection ports and said number of said connection port to which said second telephone is connected are displayed in each of displays of said personal computers in accordance with commands transmitted from said controller.

11. The key telephone system as set forth in claim 9, further comprising a splitter and a modem arranged between each of said personal computers and said key telephone unit.

12. The key telephone system as set forth in claim 9, further comprising a splitter arranged between each of said communication lines and said key telephone unit.

13. The key telephone system as set forth in claim 9, wherein each of said telephones is equipped in the associated personal computer.

14. A method of controlling a key telephone unit comprising at least three connection ports, at least one of which is connected to a public switched line, and at least a different one of which is through communication lines to a telephone connected to a telephone, each of the connection ports having a respective predetermined identification number, said method comprising the steps of:

upon receiving an off-hook signal from a first telephone connected to a first of the connection ports, transmitting an instruction from a controller within the key telephone unit to a voice guidance transmitter within the key telephone unit;

connecting the voice guidance transmitter to the first connection port for communication therebetween;

transmitting from the voice guidance transmitter to the first telephone through the first connection port those predetermined identification numbers that are associated with those of the connection ports that are not now connected;

upon the voice guidance transmitter receiving a selected identification number from the first telephone identifying a second connection port to which a second telephone is connected, the voice guidance transmitter transmitting to the second connection port the identification number associated with the first connection port;

upon receiving from the second connection port an off-hook signal, the controller causing the first and second connection ports to be connected.

15. A method of controlling a key telephone unit comprising at least three connection ports, at least one of which is connected to a public switched line, and at least a different one of which is through communication lines to a telephone connected to a telephone, each of the connection ports having a respective predetermined identification number, said method comprising the steps of:

upon receiving an off-hook signal from a first telephone connected to a first of the connection ports, transmitting an instruction from a controller within the key telephone unit to a voice guidance transmitter within the key telephone unit;

connecting the voice guidance transmitter to the first connection port for communication therebetween;

transmitting from the voice guidance transmitter to the first telephone through the first connection port those predetermined identification numbers that are associated with those of the connection ports that are not now connected.

16. The method of claim 15, wherein the key telephone unit is constructed so that all communication between the key telephone unit and each of the telephones uses only two signal lines.

* * * * *